United States Patent [19]

Sanchez et al.

[11] Patent Number: 5,772,895

[45] Date of Patent: Jun. 30, 1998

[54] SYSTEM FOR CONTROLLING THE COMPOSITION OF COLOR COUPLER ON A REAL-TIME BASIS

[75] Inventors: James Michael Sanchez, Fairport; Kevin F. Prinzing, Penfield; Eric M. Gilbert, Walworth, all of N.Y.

[73] Assignee: Eastman Kodak Company, Rochester, N.Y.

[21] Appl. No.: 602,168

[22] Filed: Feb. 15, 1996

[51] Int. Cl.[6] .............................. B01D 17/12; B01D 1/00
[52] U.S. Cl. ............................ 210/739; 159/2.1; 159/44; 159/47.1; 165/104.31; 165/200; 210/180; 210/774; 210/96.1
[58] Field of Search .................................. 159/2.1, 47.1, 159/44, 47.3; 165/200, DIG. 1, DIG. 92, 104.19, 104.28, 104.31; 210/96.1, 143, 180, 739, 774, 86, 175; 422/109; 430/546

[56] References Cited

U.S. PATENT DOCUMENTS

| | | | |
|---|---|---|---|
| 2,322,027 | 6/1943 | Jelley et al. . | |
| 3,382,917 | 5/1968 | Rice | 165/104.31 |
| 3,572,361 | 3/1971 | Terhar et al. | 137/92 |
| 3,620,915 | 11/1971 | Keyes et al. | 162/253 |
| 3,802,964 | 4/1974 | Forgacs et al. | 162/263 |
| 3,900,326 | 8/1975 | Herzhoff et al. . | |
| 3,915,712 | 10/1975 | Herzhoff et al. | 159/2.1 |
| 4,241,023 | 12/1980 | Wilke et al. | 422/187 |
| 4,379,836 | 4/1983 | Schnoring et al. . | |
| 4,544,489 | 10/1985 | Campbell et al. | 210/709 |
| 5,003,814 | 4/1991 | Crawford et al. | 137/92 |
| 5,011,571 | 4/1991 | Kobayashi et al. | 159/47.3 |
| 5,034,312 | 7/1991 | Saito | 364/149 |
| 5,339,875 | 8/1994 | English et al. | 141/9 |
| 5,411,715 | 5/1995 | Czekai et al. | 422/243 |

FOREIGN PATENT DOCUMENTS 962874  11/1978  U.S.S.R. .

*Primary Examiner*—Joseph W. Drodge
*Attorney, Agent, or Firm*—Peyton C. Watkins

[57] ABSTRACT

A system for controlling the composition of color coupler on a real time basis, the system comprises a mixer for mixing the color coupler with a non-permanent solvent for forming a preliminary solution. A heat exchanger receives the preliminary solution for altering the temperature of the preliminary solution, and a separator receives the preliminary solution from the heat exchanger for separating the preliminary solution into a color coupler solution suitable for use in producing photographic paper and into a residual vapor. An in-line viscometer receives the color coupler solution from the separator for determining the viscosity of the color coupler solution, and a process control system alters the temperature of the heat exchanger in response to a signal received from the viscometer for optimizing the composition of the color coupler solution.

2 Claims, 2 Drawing Sheets

SYSTEM FOR CONTROLLING THE COMPOSITION OF COLOR COUPLER ON A REAL-TIME BASIS

FIELD OF THE INVENTION

The invention relates generally to the field of color coupler for use in producing photographic paper and, more particularly, to a system for controlling on a real-time basis the composition of such color coupler during its production.

BACKGROUND OF THE INVENTION

A typical process for producing color coupler includes inserting a composition of color coupler, any permanent organic solvent, ethyl acetate, water, gel and surfactant into a heat exchanger for controlling its temperature. A flash separator receives the above-described composition for separating it into a color coupler solution that is suitable for use in producing photographic film and into a residual vapor, ethyl acetate and water. The color coupler is passed out of the separator via a drain pipe to a dispersion tank for storing it for later use in producing photographic film. The residual vapor is vented out of the separator to a recovery system via a vapor pipe.

A pressure sensor and a temperature sensor are both connected to the vapor pipe of the separator for respectively measuring the pressure and temperature of the residual vapor. These process measurements of the residual vapor are substantially the same as the color coupler solution, and this, consequently, permits these process variables to be used as an indication of the pressure and temperature of the color coupler solution. A programmable logic controller (PLC) receives both of these signals for determining if they are within predetermined ranges, and if they are not, the PLC sends a signal for modifying them. In regard to the temperature, the PLC sends a signal to a control valve attached to the heat exchanger for modifying the vapor temperature of the mixture passing therethrough for altering it so that it is within its range. To modify the pressure, the PLC sends a signal to an air bleed valve that is attached to the vapor pipe for altering the pressure so that it is in its range.

Although the presently known and utilized system for controlling the production of color coupler solution is satisfactory, it is not without shortcomings. The actual impact of the modification of either process parameter (i.e., temperature or pressure) on the color coupler composition, although theoretically known, is immeasurable for verifying the theoretical results. Hence, process disturbances may lead to unpredictable variations in the final color coupler concentration. In addition, such control schemes include time delays because of the limitations of devices used for measuring the process.

Consequently, a need exists for improvements in the process control system and its mode of operation so as to overcome the above-described shortcomings.

SUMMARY OF THE INVENTION

The present invention is directed to overcoming one or more of the problems set forth above. Briefly summarized, according to one aspect of the present invention, the invention resides in a system for controlling the composition of color coupler on a real time basis, the system comprising (a) means for mixing the color coupler with a non-permanent solvent for forming a preliminary solution; (b) a heat exchanger which receives the preliminary solution for altering the temperature of the preliminary solution; (c) a separator for separating the preliminary solution into a color coupler solution suitable for use in producing photographic paper and into a residual vapor; (d) an in-line viscometer which receives the color coupler solution from said separator for determining the viscosity of the color coupler solution; and (e) means for altering the temperature of said heat exchanger in response to a signal received from said viscometer for optimizing the composition of the color coupler solution.

It is an object of the present invention to provide a process of producing color coupler solution which includes real time process control.

It is an object of the present invention to provide a method of producing a color coupler solution which provides for direct product measurement and control.

It is an advantage of the present invention to provide a process control system which is easily and efficiently retrofitted with the present invention.

It is a feature of the present invention to provide an in-line viscometer which receives the color coupler solution from the separator for determining the viscosity of the color coupler solution.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
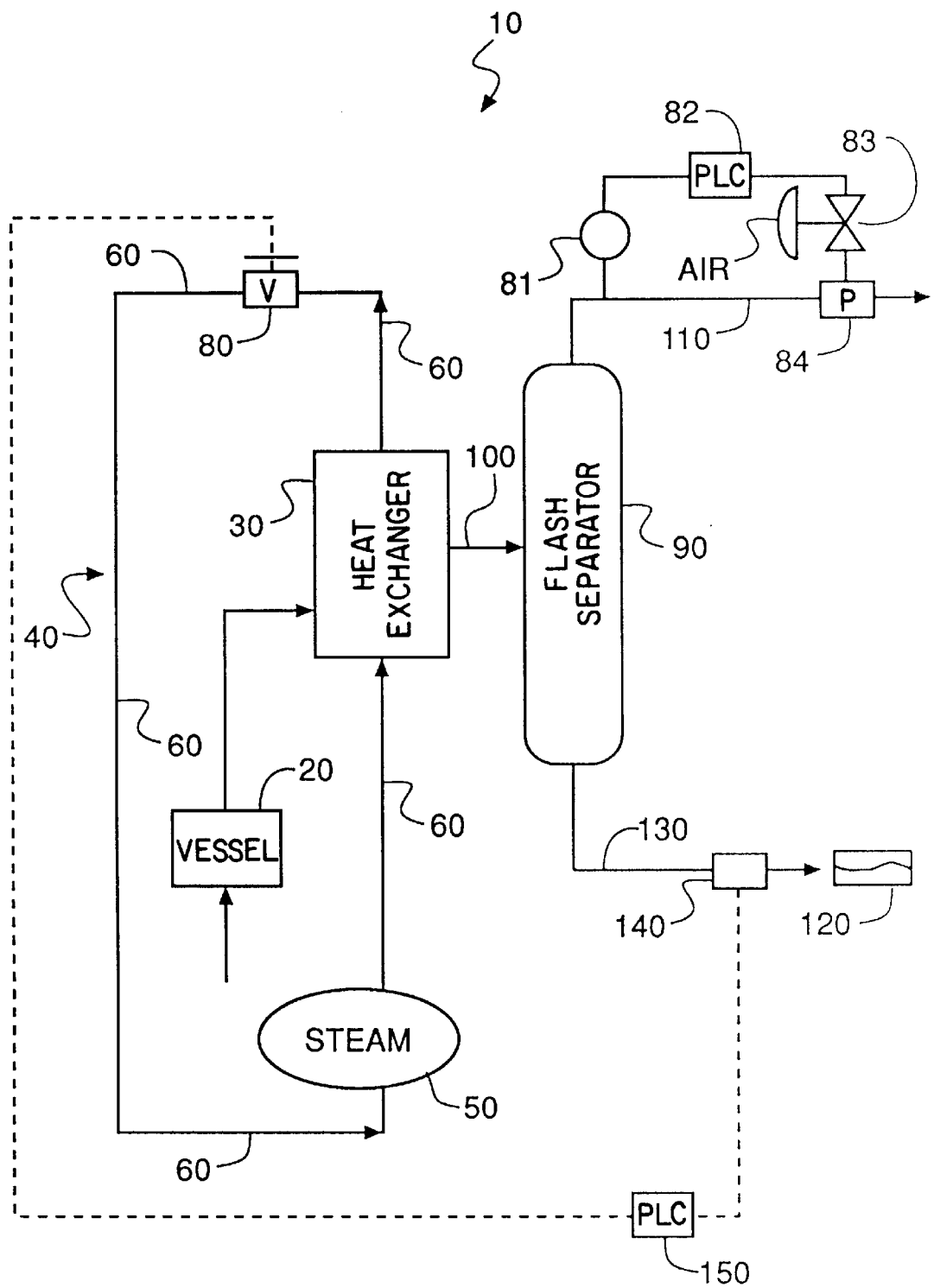
FIG. 1 is a schematic drawing of a system for producing color coupler solution and its associated control scheme.

Referring to FIG. 1, there is illustrated a system 10 for producing color coupler. An oil phase solution including a coupler, a permanent solvent and ethyl acetate non-permanent solvent is inserted into a homogenizer vessel 20 for mixing it with an aqueous phase solution of water, gel and surfactant, which is also inserted into the vessel 20. The vessel 20 mixes the solution and passes it into a heat exchanger 30 for providing the mixed solution with a predetermined temperature and pressure.

A temperature control scheme system 40 is attached to the heat exchanger 30 for permitting control of the temperature within the heat exchanger 30. In this regard, a hot water heat exchanger 50 is attached to the heat exchanger 30 via a circulation loop 60, and includes water therein for circulating the water through the heat exchanger 30. Steam is injected into the water heat exchanger 50 for enabling the water temperature to become higher, and consequently, raising the temperature of the mixed solution passing therethrough. A motorized control valve 80 is inserted into a portion of the circulation loop 60 for controlling the flow of the water therethrough. This permits the water temperature of the heat exchanger to be lowered by restricting the flow of water through the circulation loop 60. The pressure is monitored by a pressure sensor 81 which sends a signal to a PLC 82 for controlling the pressure by an air bleed valve 83 connected to a vacuum pump 84, as well known in the art.

A flash separator 90 is connected to the heat exchanger 30 via a process pipe 100 for receiving the mixed solution therefrom. The separator 90 vents a residual vapor including ethyl acetate and water to a recovery system (not shown) via a vent pipe 110, and passes a liquid solution, color coupler solution, which is useful in the production of conventional photographic film to a dispersion tank 120 via an outlet pipe 130.

Figure 2:
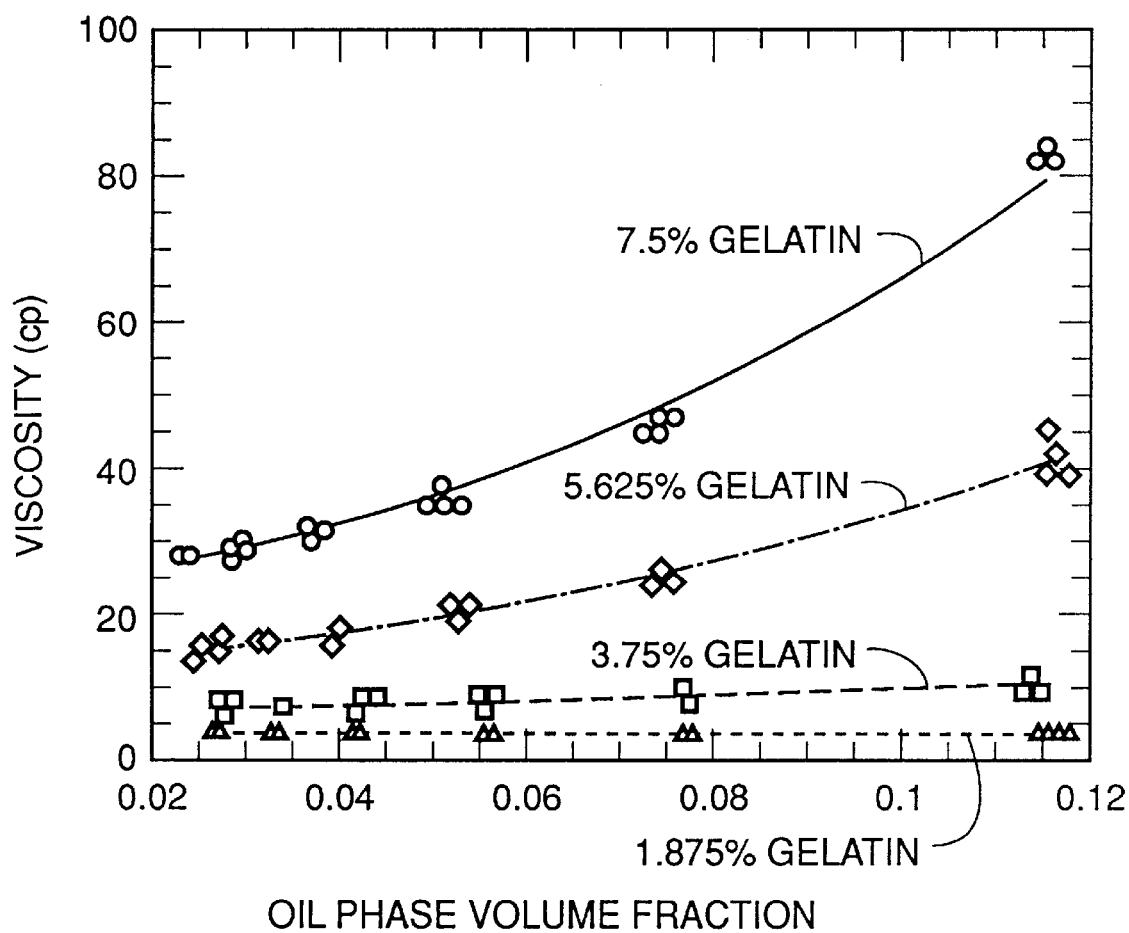
FIG. 2 is a chart illustrating viscosity versus oil phase volume fraction.

An in-line viscometer 140 is inserted into the outlet pipe 130 for measuring the viscosity of the color coupler solution. The preferred viscometer 140 is a "SOFRASER" viscometer, although any suitable viscometer may be used. In-line, when describing the viscometer, is defined herein as meaning direct measurement of the final product of the liquid of interest. The viscosity is used as an indication of the composition of the color coupler solution passing therethrough because of known relationship between viscosity and oil phase volume fraction of the color coupler solution. Referring briefly to FIG. 2, a chart is illustrated showing viscosity versus oil phase volume fraction for graphically illustrating this known relationship. Referring back to FIG. 1, a signal representative of the measured viscosity is sent to a programmable logic controller (PLC) 150 for comparing the received signal with a predetermined range that is pre-programmed into the PLC 150. The predetermined range is determined from the chart of FIG. 1 so that the viscosity range is set to correspond to the desired oil phase volume fraction range and, consequently, to the desired composition of the color coupler solution. One skilled in the art will readily recognize how to determine the range so that it is suitable for their particular use.

If the viscosity is out of the predetermined range, for example the viscosity is higher than the desired viscosity, the PLC 150 sends a signal to the motorized control valve 80 for instructing it to further close for restricting the flow therethrough. This, in turn, lowers the temperature of the vapor in the flash separator 90 and, consequently, the mixed solution therethrough. As a result, the viscosity of the mixed solution is lowered or, in other words, its composition is altered to the desired composition.

If the viscosity of the color coupler passing through the viscometer 140 is lower than the desired viscosity, the PLC 150 signals the control valve 80 to further open for permitting less restricted flow therethrough. This, ultimately, permits the composition of any incoming mixture to the separator 90 to be altered to the desired composition of color coupler solution.

The invention has been described with reference to a preferred embodiment. However, it will be appreciated that variations and modifications can be effected by a person of ordinary skill in the art without departing from the scope of the invention.

Parts List:
- 10 system
- 20 vessel
- 30 heat exchanger
- 40 control scheme
- 50 hot water exchanger
- 60 circulation loop
- 80 control valve
- 81 pressure sensor
- 82 PLC
- 83 valve
- 84 vacuum pump
- 90 flash separator
- 100 process pipe
- 110 vent pipe
- 120 dispersion tank
- 130 outlet pipe
- 140 viscometer
- 150 programmable logic controller

We claim:

1. A system for controlling the composition of color coupler on a real time basis, the system comprising:

(a) means for mixing color coupler with a non-permanent solvent for forming a preliminary solution;

(b) a heat exchanger which receives the preliminary solution for altering the temperature of the preliminary solution;

(c) a separator for separating the preliminary solution into a color coupler solution suitable for use in producing photographic film and into a residual vapor;

(d) an in-line viscometer which receives the color coupler solution from said separator for determining the viscosity of the color coupler solution;

(e) means for altering the temperature of said heat exchanger in response to a signal received from said viscometer for optimizing the composition of the color coupler solution, wherein said altering means further comprises a programmable logic controller for receiving the signal from said viscometer, and for comparing the received signal with a predetermined setpoint for determining the temperature alteration of said heat exchanger; and (f) a water heat exchanger having a circulation loop with said heat exchanger for enabling temperature variations of said heat exchanger.

2. A method for controlling the composition of color coupler on a real time basis, the method comprising:

(a) mixing the color coupler with a permanent solvent for forming a preliminary solution;

(b) altering a temperature of the preliminary solution;

(c) separating the preliminary solution into a color coupler solution suitable for use in producing photographic paper and into a residual vapor;

(d) determining viscosity of the color coupler solution by an in-line viscometer;

(e) altering the temperature of step (b) in response to a signal received from the viscometer for optimizing the composition of the color coupler solution; wherein step (b) further comprises receiving the signal from the viscometer, and comparing the received signal with a predetermined setpoint for determining the temperature alteration of step (b); and (f) enabling temperature variations of step (b) via a water heat exchanger.

* * * * *